US011373177B2

(12) United States Patent
Song et al.

(10) Patent No.: US 11,373,177 B2
(45) Date of Patent: Jun. 28, 2022

(54) METHOD FOR ISSUING CURRENCY AND MAKING PAYMENT USING UTXO-BASED PROTOCOL AND SERVER USING SAME

(71) Applicant: Coinplug, Inc., Gyeonggi-do (KR)

(72) Inventors: Joo Han Song, Gyeonggi-do (KR); Jay Wu Hong, Seoul (KR); Joon Sun Uhr, Gyeonggi-do (KR)

(73) Assignee: COINPLUG, INC., Gyeonggi-Do (KR)

( * ) Notice: Subject to any disclaimer, the term of this patent is extended or adjusted under 35 U.S.C. 154(b) by 280 days.

(21) Appl. No.: 16/380,468

(22) Filed: Apr. 10, 2019

(65) Prior Publication Data
US 2019/0236602 A1    Aug. 1, 2019

Related U.S. Application Data

(63) Continuation of application No. PCT/KR2017/011937, filed on Oct. 26, 2017.

(30) Foreign Application Priority Data

Oct. 26, 2016  (KR) .................. 10-2016-0140163

(51) Int. Cl.
*G06Q 20/38*    (2012.01)
*G06Q 20/10*    (2012.01)
(Continued)

(52) U.S. Cl.
CPC ......... *G06Q 20/3829* (2013.01); *G06Q 20/06* (2013.01); *G06Q 20/108* (2013.01);
(Continued)

(58) Field of Classification Search
None
See application file for complete search history.

(56) References Cited

U.S. PATENT DOCUMENTS 6,484,260 B1 * 11/2002 Scott ..................... G07F 7/1008
713/182
7,395,436 B1 *  7/2008 Nemovicher ....... H04L 63/0823
726/28
(Continued)

FOREIGN PATENT DOCUMENTS

KR    10-1575030 B1    12/2015
KR    10-1637854 B1     7/2016

OTHER PUBLICATIONS

Bui et al (Application of Public Ledgers to Revocation in Distributed Access Control) (Year: 2016).*
(Continued)

*Primary Examiner* — Mamon Obeid
(74) *Attorney, Agent, or Firm* — Holzer Patel Drennan

(57) ABSTRACT

The present invention relates to a method for issuing a currency comprising the steps of: (a) confirming the validity of a currency issuing transaction and a currency issuer, when the currency issuing transaction for issuing the currency from the currency issuer is obtained, the currency issuing transaction including (i) currency receiver information, (ii) issued amount of the currency, (iii) a public key of the currency issuer, and (iv) a signature value of the currency issuer signing the (i), (ii), and (iii) with a private key of the currency issuer; and (b) registering the currency issuing transaction or a function value thereof on a public blockchain network, and obtaining a currency issuance public transaction ID indicating location information of the currency issuing transaction or the function value thereof on the public blockchain network, when the currency issuing transaction and the currency issuer are deemed valid.

8 Claims, 5 Drawing Sheets

(51) Int. Cl.
*H04L 9/06* (2006.01)
*H04L 9/32* (2006.01)
*G06Q 40/04* (2012.01)
*G06Q 20/06* (2012.01)
*G06Q 40/02* (2012.01)
*G06Q 20/36* (2012.01)

(52) U.S. Cl.
CPC .......... *G06Q 20/36* (2013.01); *G06Q 20/385* (2013.01); *G06Q 40/02* (2013.01); *G06Q 40/04* (2013.01); *H04L 9/0637* (2013.01); *H04L 9/3239* (2013.01); *H04L 9/3247* (2013.01); *H04L 2209/38* (2013.01); *H04L 2209/56* (2013.01)

(56) References Cited

U.S. PATENT DOCUMENTS

| | | | | |
|---|---|---|---|---|
| 10,164,779 | B2* | 12/2018 | Uhr | G06F 16/2246 |
| 10,354,325 | B1* | 7/2019 | Skala | G06Q 20/065 |
| 10,532,268 | B2* | 1/2020 | Tran | G06F 1/163 |
| 10,579,974 | B1* | 3/2020 | Reed | G06Q 20/065 |
| 10,783,501 | B1* | 9/2020 | Ramanathan | G06Q 20/0655 |
| 11,037,111 | B2* | 6/2021 | Song | G06Q 20/3825 |
| 11,055,707 | B2* | 7/2021 | Lingappa | G06Q 20/065 |
| 11,100,476 | B1* | 8/2021 | Yan | G06Q 20/02 |
| 2001/0032310 | A1* | 10/2001 | Corella | H04L 9/3239 713/156 |
| 2003/0212892 | A1* | 11/2003 | Oishi | H04L 69/167 713/153 |
| 2005/0114666 | A1* | 5/2005 | Sudia | H04L 9/3268 713/175 |
| 2008/0152145 | A1* | 6/2008 | Fujioka | G06F 21/6245 709/202 |
| 2009/0070256 | A1* | 3/2009 | Lundberg | G06Q 40/00 705/35 |
| 2014/0196142 | A1* | 7/2014 | Louboutin | G06F 21/445 726/16 |
| 2014/0330721 | A1* | 11/2014 | Wang | G06Q 40/04 705/44 |
| 2015/0170112 | A1* | 6/2015 | DeCastro | G06Q 20/381 705/39 |
| 2015/0326543 | A1* | 11/2015 | Pochuev | H04W 12/04 713/155 |
| 2015/0332256 | A1* | 11/2015 | Minor | G06Q 20/381 705/69 |
| 2015/0332395 | A1* | 11/2015 | Walker | H04L 9/30 705/69 |
| 2015/0371224 | A1* | 12/2015 | Lingappa | G06Q 20/401 705/71 |
| 2016/0253663 | A1* | 9/2016 | Clark | G06Q 20/3825 705/75 |
| 2017/0046651 | A1* | 2/2017 | Lin | G06Q 10/08 |
| 2017/0046698 | A1* | 2/2017 | Haldenby | G06Q 30/0214 |
| 2017/0132626 | A1* | 5/2017 | Kennedy | G06Q 20/065 |
| 2017/0149819 | A1* | 5/2017 | Androulaki | H04L 63/0823 |
| 2017/0232300 | A1* | 8/2017 | Tran | A63B 60/16 434/247 |
| 2017/0257358 | A1* | 9/2017 | Ebrahimi | H04L 63/061 |
| 2017/0289197 | A1* | 10/2017 | Mandyam | H04L 63/0428 |
| 2017/0329980 | A1* | 11/2017 | Hu | H04L 63/04 |
| 2017/0331896 | A1* | 11/2017 | Holloway | H04L 67/04 |
| 2017/0344988 | A1* | 11/2017 | Cusden | H04L 63/06 |
| 2018/0032273 | A1* | 2/2018 | Ateniese | H04L 9/3242 |
| 2018/0060596 | A1* | 3/2018 | Hamel | H04L 9/3242 |
| 2018/0068130 | A1* | 3/2018 | Chan | G06F 21/606 |
| 2018/0078843 | A1* | 3/2018 | Tran | A63B 69/36 |
| 2018/0101844 | A1* | 4/2018 | Song | G06Q 20/3829 |
| 2018/0109516 | A1* | 4/2018 | Song | H04L 9/3268 |
| 2018/0117447 | A1* | 5/2018 | Tran | A63B 71/145 |
| 2018/0129956 | A1* | 5/2018 | Saxena | G06F 21/6245 |
| 2018/0204191 | A1* | 7/2018 | Wilson | H04L 9/30 |
| 2018/0264347 | A1* | 9/2018 | Tran | G06F 3/00 |
| 2018/0268401 | A1* | 9/2018 | Ortiz | G06Q 20/3674 |
| 2019/0180273 | A1* | 6/2019 | Cummings | G06Q 20/389 |
| 2019/0220859 | A1* | 7/2019 | Weight | G06Q 20/384 |
| 2019/0236565 | A1* | 8/2019 | Song | G06Q 40/02 |
| 2019/0236602 | A1* | 8/2019 | Song | G06Q 20/405 |
| 2019/0279247 | A1* | 9/2019 | Finken | G06Q 20/065 |
| 2019/0295069 | A1* | 9/2019 | Pala | G06Q 20/3678 |
| 2019/0296920 | A1* | 9/2019 | Uhr | H04L 12/08 |
| 2019/0361917 | A1* | 11/2019 | Tran | G06Q 40/04 |
| 2019/0370866 | A1* | 12/2019 | Lawbaugh | G06Q 30/0254 |
| 2020/0074461 | A1* | 3/2020 | DeRosa-Grund | H04N 21/2541 |
| 2020/0076827 | A1* | 3/2020 | Gluck | H04L 63/123 |
| 2020/0099518 | A1* | 3/2020 | Jacobs | G06Q 20/3825 |
| 2020/0106623 | A1* | 4/2020 | Andreina | H04L 9/3297 |
| 2020/0118096 | A1* | 4/2020 | Yang | H04L 9/3239 |
| 2020/0151682 | A1* | 5/2020 | Hurry | H04L 63/12 |
| 2020/0167745 | A1* | 5/2020 | Shin | G06Q 20/0855 |
| 2020/0167764 | A1* | 5/2020 | Lin | G06Q 20/065 |
| 2020/0186510 | A1* | 6/2020 | Kursun | H04L 63/08 |
| 2020/0242591 | A1* | 7/2020 | Sevindik | G06Q 20/32 |
| 2020/0260147 | A1* | 8/2020 | Madisetti | H04N 21/4753 |
| 2020/0273048 | A1* | 8/2020 | Andon | H04L 9/0894 |
| 2020/0334379 | A1* | 10/2020 | DeRosa-Grund | H04L 9/3239 |
| 2020/0394159 | A1* | 12/2020 | Hurley | G06Q 20/0658 |
| 2020/0394176 | A1* | 12/2020 | Wu | G06F 16/2379 |
| 2020/0394177 | A1* | 12/2020 | Maurer | G06F 9/45504 |
| 2020/0396072 | A1* | 12/2020 | Maurer | G06F 16/2379 |
| 2021/0167972 | A1* | 6/2021 | Zang | H04L 63/061 |
| 2021/0192012 | A1* | 6/2021 | Ohashi | G06F 21/10 |
| 2021/0374696 | A1* | 12/2021 | Chau | G06F 16/2379 |

OTHER PUBLICATIONS

Olavsrud, Thor, "Why Blockchain Can Be Fatal to Your Company", CIO Korea, Sep. 7, 2016, Internet: http://www.ciokorea.com/print/3161, pp. 1-3.

Wuille, Pieter, "Tree Signatures", Blockstream, Aug. 24, 2015, Internet: URL:https://blockstream.com/2015/08/24/treesignatures.html, pp. 1-6.

Kim, Kang Mo, "Data Forgery Detection of Private Blockchain using Public Blockchain", GitHub, Aug. 5, 2016, Internet:<URL: https://github.com/Kangmo/blitz/wiki/%ED%8D%BC%EB%B8%94%EB%A6%AD-EB%B8%94%EB%AI%9D%EC%B2%B4%EC%9D%B8%EC%9D%84-%ED%99%9C%EC%9A%A9%ED%95%9C-%ED%84%94%EB%9D%BC%EC%9D%B4%EB%B9%97-%EB%B8%94%EB%AI%9D%EC%B2%B4%EC%9D%B8%EC%9D%98-EB%8D%B0%EC%9D%B4%ED%84%B0-EC%9C%84%EB%B3%80%EC%A1%B0-B0-%ED%83%90%EC%A7%80>.

International Search Report for Application No. PCT/KR2017/0110937, dated Jan. 17, 2018.

* cited by examiner

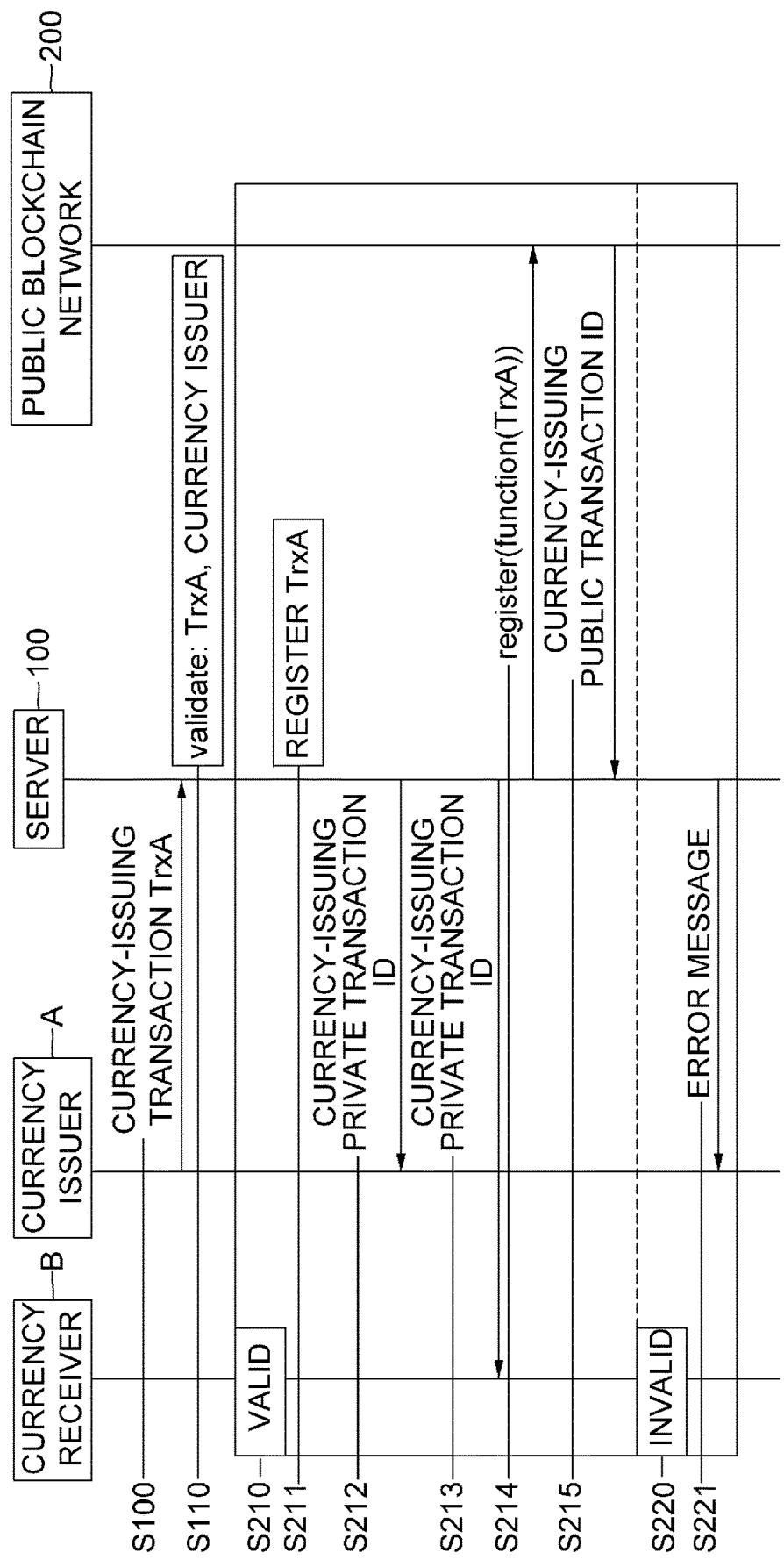

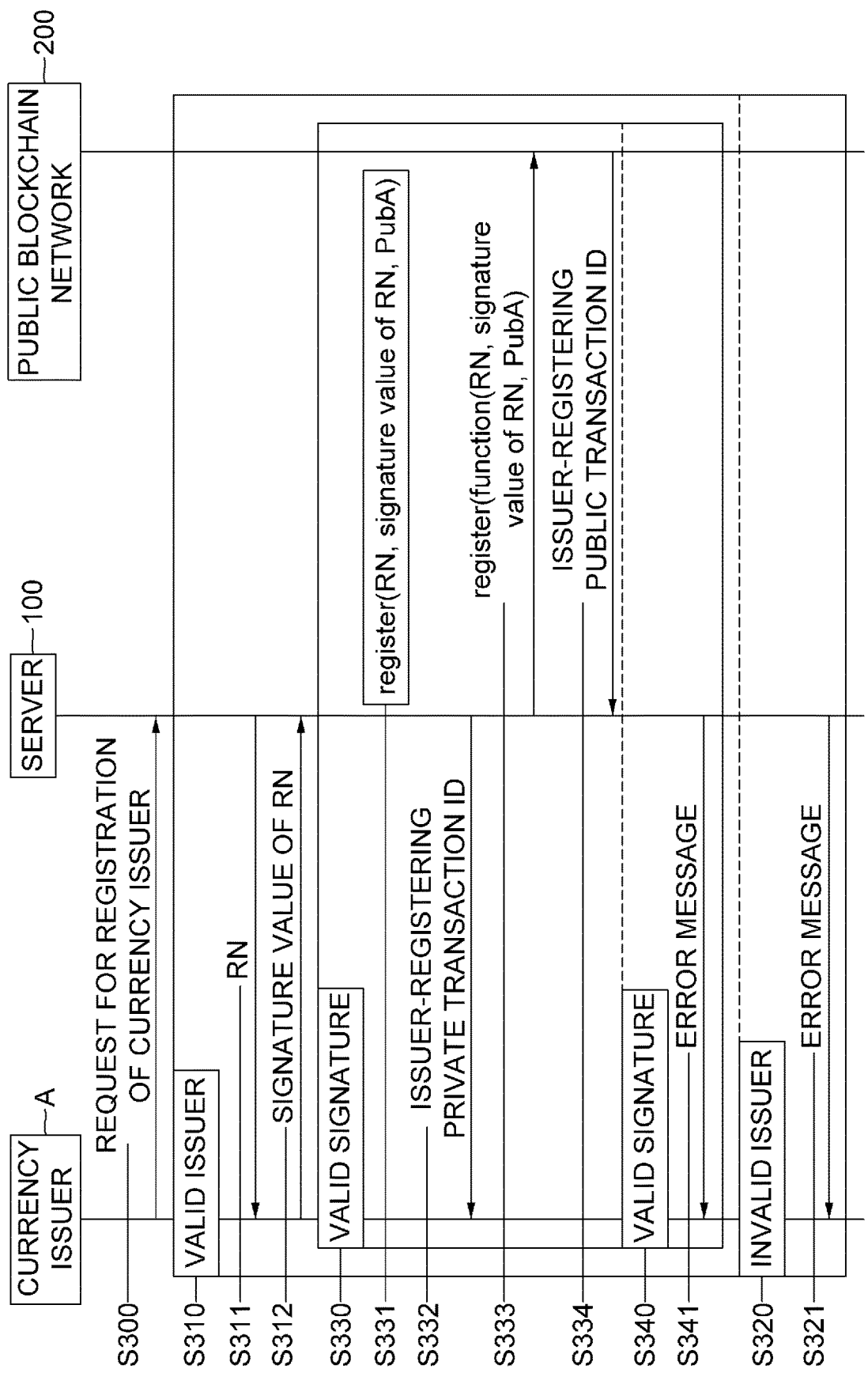

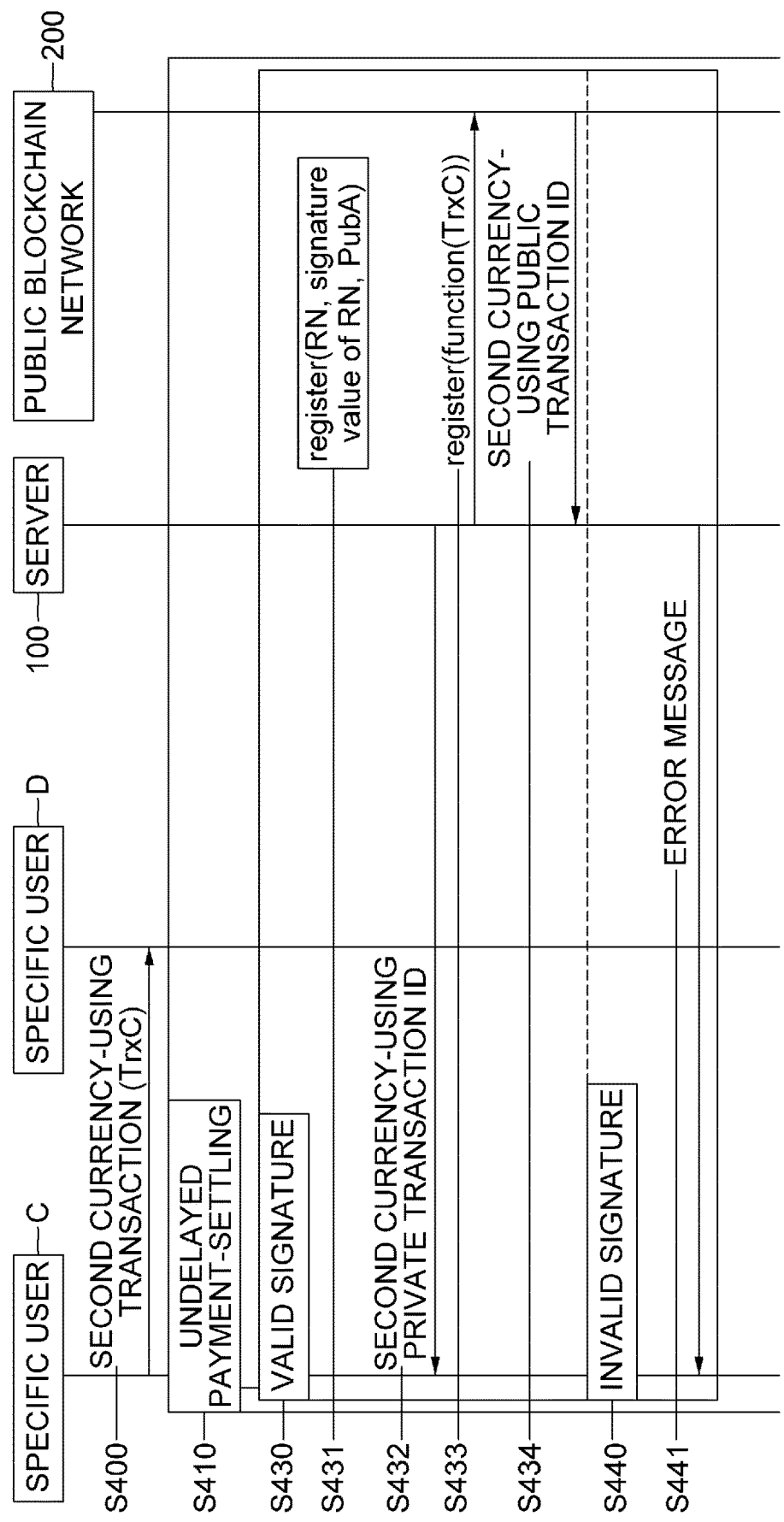

METHOD FOR ISSUING CURRENCY AND MAKING PAYMENT USING UTXO-BASED PROTOCOL AND SERVER USING SAME

CROSS REFERENCE TO RELATED APPLICATIONS

The present application is a continuation of International Application PCT/KR2017/011937, entitled "METHOD FOR ISSUING CURRENCY AND MAKING PAYMENT USING UTXO-BASED PROTOCOL AND SEVER USING SAME," filed on Oct. 26, 2017, which claims the benefit of Basic Korean Patent Application Serial No. 10-2016-0140163, entitled "METHOD FOR ISSUING AND PAYING MONEY IN USE OF UNSPENT TRANSACTION OUTPUT BASED PROTOCOL, AND SERVER USING THE SAME," filed on Oct. 26, 2016, all of which is specifically incorporated by reference for all they disclose and teach.

FIELD OF THE DISCLOSURE

The present disclosure relates to a method for issuing and settling a payment of a currency; and more particularly, to the method of registering a transaction in a public blockchain network or and settling the payment of the currency, and the server using the same.

BACKGROUND OF THE DISCLOSURE

A currency refers to money in any form when in actual use or circulation as a medium of exchange, especially circulating banknotes and coins, that is, monetary units in payment and commercial distribution, in a nation. Also, some forms of bartering ways used exclusively in certain groups may be considered as the currency.

Within a nation, a central bank issues and manages the currency, and banking institutions in a private sector use the issued currency.

Herein, payments between the banking institutions are done via a payment system of the central bank without actual transfer of hard money. That is, the payment is done by deposit and withdrawal in and out of accounts of banks open at the central bank.

However, such a payment system requires settling of the payments on a daily basis, after close of business of the central bank and the banking institutions.

Also, the settling of the payments further requires processing of huge payment data, and in case its result has an error, its correction calls for much resources.

Also, illegal copying or forgery of recorded data caused by hacking of the payment system or the banking institutions requires much resources for their corrections.

SUMMARY OF THE DISCLOSURE

It is an object of the present disclosure to solve all the aforementioned problems.

It is another object of the present disclosure to provide a method of recording information on an issuance of a currency or on settling a payment in a blockchain of a virtual currency to prevent forgery and illegal copying, and a server using the same.

It is still another object of the present disclosure to provide a method of securing the information on the issuance of the currency or on settling the payment, and preventing the forgery and the illegal copying thereof, by using specific functions and cryptography, and the server using the same.

It is still yet another object of the present disclosure to provide a method of preventing duplicate payments of the currency, by recording the information on the issuance of the currency or on settling the payment in the the blockchain of the virtual currency, and the server using the same.

It is still yet another object of the present disclosure to provide a method of maintaining up-to-date settlement information without any settling procedure between a central bank and banking institutions in a private sector, and the server using the same.

In accordance with one aspect of the present disclosure, there is provided a method for issuing a currency, including steps of: (a) a server, if at least one currency-issuing transaction including (i) information on a currency receiver, (ii) an issued amount of the currency, (iii) a public key of a currency issuer, and (iv) a signature value of the currency issuer generated by signing (i), (ii) and (iii) with a private key of the currency issuer, is acquired from the currency issuer, determining or supporting another device to determine each of validities of the currency-issuing transaction and the currency issuer; and (b) the server, if each of the validities is confirmed, performing or supporting another device to perform processes of (b1) registering in a public blockchain network (b1-1) the currency-issuing transaction including (i) the information on the currency receiver, (ii) the issued amount of the currency, (iii) the public key of the currency issuer, and (iv) the signature value of the currency issuer, or (b1-2) its function value and (b2) acquiring at least one currency-issuing public transaction ID representing at least one location of the currency-issuing transaction or its function value on the public blockchain network.

As one example, at the step of (b), if each of the validities is confirmed, the server performs or supports another device to perform processes of further registering the currency-issuing transaction including (i) the information on the currency receiver, (ii) the issued amount of the currency, (iii) the public key of the currency issuer, and (iv) the signature value of the currency issuer in a private blockchain network and providing at least one currency-issuing private transaction ID representing at least one location of the currency-issuing transaction on the private blockchain network to at least part of the currency issuer and the currency receiver.

As one example, at the step of (a), the server confirms or supports another device to confirm a validity of a data format of the currency-issuing transaction including (i) the information on the currency receiver, (ii) the issued amount of the currency, (iii) the public key of the currency issuer, and (iv) the signature value of the currency issuer, a validity of the currency receiver, a validity of the public key of the currency issuer, and a validity of the signature value of the currency issuer, wherein the signature value of the currency issuer is verified with the pre-registered public key of the currency issuer, to thereby determine whether the currency-issuing transaction is valid.

As one example, at the step of (a), the server determines or supports another device to determine whether the signature value of the currency issuer is valid, by verifying the signature value of the currency issuer with the pre-registered public key of the currency issuer.

As one example, before the step of (a), the method further comprises steps of: (a01) the server, if a request for registration of the currency issuer using the public key of the currency issuer is acquired, performing or supporting another device to perform processes of determining whether the currency issuer is valid and transmitting a specific random nonce to the currency issuer who is determined as valid; and (a02) the server, if a signature value of the specific random nonce generated by signing the specific random nonce with the private key of the currency issuer is acquired, performing or supporting another device to perform processes of determining whether the signature value of the specific random nonce is valid by using the public key of the currency issuer, registering at least one issuer-registering transaction, including (1) the specific random nonce (2) the signature value of the specific random nonce and (3) the public key of the currency issuer, or its function value in the public blockchain network, and acquiring at least one issuer-registering public transaction ID representing at least one location of the issuer-registering transaction or its function value on the public blockchain network.

As one example, at the step of (a02), the server performs or supports another device to perform processes of further registering in the private blockchain network the issuer-registering transaction including (1) the specific random nonce (2) the signature value of the specific random nonce and (3) the public key of the currency issuer, and providing at least one issuer-registering private transaction ID representing at least one location of the issuer-registering transaction on the private blockchain network to the currency issuer.

As one example, at the step of (a01), the server determines or supports another device to determine whether the currency issuer is valid, by using one of (1) a certificate of the currency issuer based on a public key infrastructure and (2) information on an identification of the currency issuer.

In accordance with another aspect of the present disclosure, there is provided a method for settling a payment of a currency, including steps of: (a) a server, if (i) at least one first currency-using transaction ID of at least one first currency-using transaction partly unused beforehand, (ii) information on a currency receiver, (iii) a specific amount of settling the payment, (iv) a public key of a specific user, and (v) a signature value generated by signing (i), (ii), (iii), and (iv) with a private key of the specific user, are included in at least one second currency-using transaction and if the second currency-using transaction is acquired from the specific user, determining or supporting another device to determine a type of the payment in the second currency-using transaction by referring to a total balance of the specific user in the second currency-using transaction; and (b) (1) the server, in case the type of the payment of the second currency-using transaction is determined as an undelayed payment by detecting that the total balance of the specific user is equal to or greater than the specific amount of settling the payment, and if the signature value of the specific user is determined as valid, performing or supporting another device to perform processes of registering the second currency-using transaction or its function value in the public blockchain network, acquiring at least one second currency-using public transaction ID representing at least one location of the second currency-using transaction on the public blockchain network, and (2) the server, in case the type of the payment of the second currency-using transaction is determined as a delayed payment inferred by detecting that the total balance of the specific user is less than the specific amount of settling the payment, and if the signature value of the specific user is determined as valid, on condition that the second currency-using transaction has been stored, in response to the server detecting that at least one third currency-using transaction satisfies at least one of predetermined set-off conditions wherein the third currency-using transaction includes information representing that the payment is to be settled by at least one of other users and that the specific user is a receiver, performing or supporting another device to perform processes of setting off the second currency-using transaction and the third currency-using transaction, and registering the set-off second currency-using transaction or its function value and the set-off third currency-using transaction or its function value in the public blockchain network, and acquiring at least one second currency-using public transaction ID representing at least one location of the second currency-using transaction or its function value and at least one third currency-using public transaction ID representing at least one location of the third currency-using transaction or its function value on the public blockchain network.

As one example, if the first currency-using transaction ID is a first currency-using private transaction ID representing a location of the first currency-using transaction on the private blockchain network, at the step of (b), (1) in case the type of the payment of the second currency-using transaction is determined as the undelayed payment inferred by detecting that the total balance of the specific user is equal to or greater than the specific amount of settling the payment, the server, if the signature value of the specific user is determined as valid, performs or supports another device to perform processes of further registering the second currency-using transaction in the private blockchain network, and providing at least one second currency-using private transaction ID representing at least one location of the second currency-using transaction on the private blockchain network to at least part of the specific user and the currency receiver, and (2) in case the type of the payment of the second currency-using transaction is determined as the delayed payment inferred by detecting that the total balance of the specific user is less than the specific amount of settling the payment, the server, if the signature value of the specific user is determined as valid, performs or supports another device to perform processes of further registering the set-off second currency-using transaction and the set-off third currency-using transaction in the private blockchain network and providing the second currency-using private transaction ID representing at least one location of the second currency-using transaction or its function value on the private blockchain network and at least one third currency-using private transaction ID representing at least one location of the third currency-using transaction or its function value on the private blockchain network to at least part of (i) the specific user, (ii) the currency receiver, and (iii) said at least one of other users.

As one example, the second currency-using transaction includes a transaction balance after the specific amount is paid and information on an owner of the transaction balance.

As one example, the second currency-using transaction further includes at least one of the undelayed payment and the delayed payment as a type of the payment, and wherein, at the step of (b), the server, if the total balance of the specific user is less than the specific amount even though the type of the payment of the second currency-using transaction is the undelayed payment, determines or supports another device to determine the type of the payment of the second currency-using transaction as the delayed payment.

As one example, said one of the predetermined set-off conditions is a condition that the total balance of the specific user is equal to or greater than 0 by the set-off performed in response to the third currency-using transaction.

As one example, before the step of (a), the method further comprises steps of: (a01) the server, if a request for registration of the specific user using the public key of the specific user is acquired, performing or supporting another device to perform processes of determining whether the specific user is valid and transmitting a specific random nonce to the specific user who is determined as valid; and (a02) the server, if a signature value of the specific random nonce generated by signing the specific random nonce with the private key of the specific user is acquired, performing or supporting another device to perform processes of determining whether the signature value of the specific random nonce is valid by using the public key of the specific user, registering at least one user-registering transaction, including (1) the specific random nonce (2) the signature value of the specific random nonce and (3) the public key of the specific user, or its function value in the public blockchain network, and acquiring at least one user-registering public transaction ID representing at least one location of the user-registering transaction or its function value on the public blockchain network.

As one example, at the step of (a02), the server performs or supports another device to perform processes of further registering in the private blockchain network the user-registering transaction including (1) the specific random nonce (2) the signature value of the specific random nonce and (3) the public key of the specific user, and providing at least one user-registering private transaction ID representing at least one location of the user-registering transaction on the private blockchain network to the specific user.

In accordance with still another aspect of the present disclosure, there is provided a server for issuing a currency, including: at least one memory that stores instructions; and at least one processor configured to execute the instructions to: perform processes of (I) if at least one currency-issuing transaction including (i) information on a currency receiver, (ii) an issued amount of the currency, (iii) a public key of a currency issuer, and (iv) a signature value of the currency issuer generated by signing (i), (ii) and (iii) with a private key of the currency issuer, is acquired from the currency issuer, determining or supporting another device to determine each of validities of the currency-issuing transaction and the currency issuer; and (II) if each of the validities is confirmed, performing or supporting another device to perform processes of (IIa) registering in a public blockchain network (IIa-1) the currency-issuing transaction including (i) the information on the currency receiver, (ii) the issued amount of the currency, (iii) the public key of the currency issuer, and (iv) the signature value of the currency issuer, or (IIa-2) its function value and (IIb) acquiring at least one currency-issuing public transaction ID representing at least one location of the currency-issuing transaction or its function value on the public blockchain network.

As one example, at the process of (II), if each of the validities is confirmed, the processor performs or supports another device to perform processes of further registering the currency-issuing transaction including (i) the information on the currency receiver, (ii) the issued amount of the currency, (iii) the public key of the currency issuer, and (iv) the signature value of the currency issuer in a private blockchain network and providing at least one currency-issuing private transaction ID representing at least one location of the currency-issuing transaction on the private blockchain network to at least part of the currency issuer and the currency receiver.

As one example, before the process of (II), the processor further performs processes of: (I01) if a request for registration of the currency issuer using the public key of the currency issuer is acquired, performing or supporting another device to perform processes of determining whether the currency issuer is valid and transmitting a specific random nonce to the currency issuer who is determined as valid; and (I02) if a signature value of the specific random nonce generated by signing the specific random nonce with the private key of the currency issuer is acquired, performing or supporting another device to perform processes of determining whether the signature value of the specific random nonce is valid by using the public key of the currency issuer, registering at least one issuer-registering transaction, including (1) the specific random nonce (2) the signature value of the specific random nonce and (3) the public key of the currency issuer, or its function value in the public blockchain network, and acquiring at least one issuer-registering public transaction ID representing at least one location of the issuer-registering transaction or its function value on the public blockchain network.

As one example, at the process of (I02), the processor performs or supports another device to perform processes of further registering in the private blockchain network the issuer-registering transaction including (1) the specific random nonce (2) the signature value of the specific random nonce and (3) the public key of the currency issuer, and providing at least one issuer-registering private transaction ID representing at least one location of the issuer-registering transaction on the private blockchain network to the currency issuer.

In accordance with still yet another aspect of the present disclosure, there is provided a server for settling a payment of a currency, including: at least one memory that stores instructions; and at least one processor configured to execute the instructions to: perform processes of (I) if (i) at least one first currency-using transaction ID of at least one first currency-using transaction partly unused beforehand, (ii) information on a currency receiver, (iii) a specific amount of settling the payment, (iv) a public key of a specific user, and (v) a signature value generated by signing (i), (ii), (iii), and (iv) with a private key of the specific user, are included in at least one second currency-using transaction and if the second currency-using transaction is acquired from the specific user, determining or supporting another device to determine a type of the payment in the second currency-using transaction by referring to a total balance of the specific user in the second currency-using transaction; and (II) (1) in case the type of the payment of the second currency-using transaction is determined as an undelayed payment by detecting that the total balance of the specific user is equal to or greater than the specific amount of settling the payment, and if the signature value of the specific user is determined as valid, performing or supporting another device to perform processes of registering the second currency-using transaction or its function value in the public blockchain network, acquiring at least one second currency-using public transaction ID representing at least one location of the second currency-using transaction on the public blockchain network, and (2) in case the type of the payment of the second currency-using transaction is determined as a delayed payment inferred by detecting that the total balance of the specific user is less than the specific amount of settling the payment, and if the signature value of the specific user is determined as valid, on condition that the second currency-using transaction has been stored, in response to the server detecting that at least one third currency-using transaction satisfies at least one of predetermined set-off conditions wherein the third currency-using transaction includes information representing that the payment is to be settled by at least one of other users and that the specific user is a receiver, performing or supporting another device to perform processes of setting off the second currency-using transaction and the third currency-using transaction, and registering the set-off second currency-using transaction or its function value and the set-off third currency-using transaction or its function value in the public blockchain network, and acquiring at least one second currency-using public transaction ID representing at least one location of the second currency-using transaction or its function value and at least one third currency-using public transaction ID representing at least one location of the third currency-using transaction or its function value on the public blockchain network.

As one example, if the first currency-using transaction ID is a first currency-using private transaction ID representing a location of the first currency-using transaction on the private blockchain network, at the process of (II), (1) in case the type of the payment of the second currency-using transaction is determined as the undelayed payment inferred by detecting that the total balance of the specific user is equal to or greater than the specific amount of settling the payment, the processor, if the signature value of the specific user is determined as valid, performs or supports another device to perform processes of further registering the second currency-using transaction in the private blockchain network, and providing at least one second currency-using private transaction ID representing at least one location of the second currency-using transaction on the private blockchain network to at least part of the specific user and the currency receiver, and (2) in case the type of the payment of the second currency-using transaction is determined as the delayed payment inferred by detecting that the total balance of the specific user is less than the specific amount of settling the payment, the processor, if the signature value of the specific user is determined as valid, performs or supports another device to perform processes of further registering the set-off second currency-using transaction and the set-off third currency-using transaction in the private blockchain network and providing the second currency-using private transaction ID representing at least one location of the second currency-using transaction or its function value on the private blockchain network and at least one third currency-using private transaction ID representing at least one location of the third currency-using transaction or its function value on the private blockchain network to at least part of (i) the specific user, (ii) the currency receiver, and (iii) said at least one of other users.

As one example, before the process of (I), the processor further performs processes of: (I01) if a request for registration of the specific user using the public key of the specific user is acquired, performing or supporting another device to perform processes of determining whether the specific user is valid and transmitting a specific random nonce to the specific user who is determined as valid; and (I02) if a signature value of the specific random nonce generated by signing the specific random nonce with the private key of the specific user is acquired, performing or supporting another device to perform processes of determining whether the signature value of the specific random nonce is valid by using the public key of the specific user, registering at least one user-registering transaction, including (1) the specific random nonce (2) the signature value of the specific random nonce and (3) the public key of the specific user, or its function value in the public blockchain network, and acquiring at least one user-registering public transaction ID representing at least one location of the user-registering transaction or its function value on the public blockchain network.

As one example, at the process of (I02), the processor performs or supports another device to perform processes of further registering in the private blockchain network the user-registering transaction including (1) the specific random nonce (2) the signature value of the specific random nonce and (3) the public key of the specific user, and providing at least one user-registering private transaction ID representing at least one location of the user-registering transaction on the private blockchain network to the specific user.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

FIG. 2 is a drawing schematically illustrating a method for issuing the currency in accordance with one example embodiment of the present disclosure.

FIG. 3 is a drawing schematically illustrating a method of registering a currency issuer in accordance with one example embodiment of the present disclosure.

FIG. 4A is a drawing schematically illustrating a method for an undelayed payment of a payment of the currency in accordance with one example embodiment of the present disclosure.

DETAILED DESCRIPTION OF THE PREFERRED EMBODIMENTS

Figure 1:
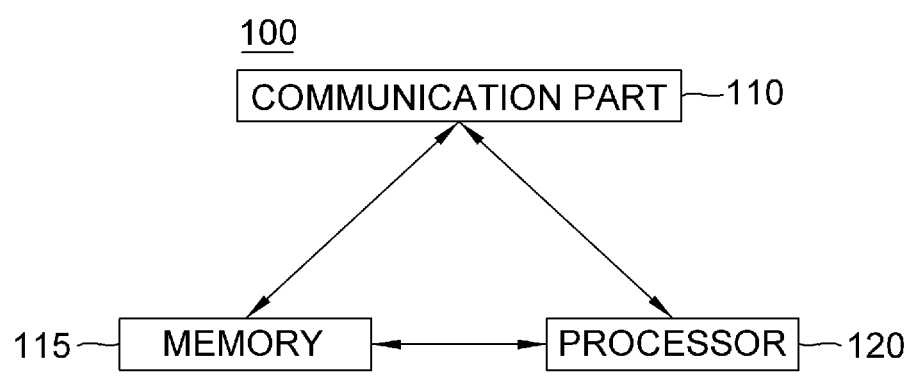
FIG. 1 is a drawing schematically illustrating a server for issuing a currency in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Herein, a private blockchain network may include a private blockchain database, and a public blockchain network may include a public blockchain database, but the scope of the present disclosure is not limited thereto. Also, a currency may include a cryptocurrency, but the scope of the present disclosure is not limited thereto.

To allow those skilled in the art to the present disclosure to be carried out easily, the example embodiments of the present disclosure by referring to attached diagrams will be explained in detail as shown below. Throughout the present disclosure, every processor, every memory, every storage, or any other computing components are described as separate components, however, said every processor, said every memory, said every storage, or said any other computing components may be configured as a single device or any other combinations thereof. Also, a specific function used in the present disclosure may be a hashing function, and a function value may be a hash value generated by using the hashing function, but the scope of the present disclosure is not limited thereto.

Also, a term "specific" is added to terms or concepts related to major subjects who is active in taking actions, a term "associated" is added to terms or concepts related to other subjects, and in descriptions below, the term "specific" and the term "associated" may be omitted, as either of the concepts is apparent from the context. However, the terms "specific" and "associated" are used in claims for clarification.

FIG. 1 is a drawing schematically illustrating a server 100 issuing a currency, and the server 100 may include a communication part 110, a memory 115 for storing instructions to issue and settle a payment of a currency, and a processor 120 for performing processes to issue and settle the payment of the currency corresponding to the instructions in the memory 115, in accordance with one example embodiment of the present disclosure. Identical reference numerals are for convenience of explanation but not intended for representing sameness of separate devices. Further, according to another example embodiment of the present disclosure, the method may be performed by the server 100 or another server of a different configuration.

The server 100 typically achieves a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part 110 of such devices may transmit requests to and receive responses from other linked devices. As one example, such requests and responses may be carried out by the same TCP session, but the scope of the present disclosure is not limited thereto. For example, they could be transmitted and received as UDP datagrams.

The processor 120 of such devices may include hardware configuration of MPU (Micro Processing Unit) or CPU (Central Processing Unit), cache memory, data bus, etc. Additionally, any OS and software configuration of applications that achieve specific purposes may be further included.

First, by referring to the server in FIG. 1, a method for issuing the currency by referring to FIG. 2 in accordance with one example embodiment of the present disclosure is described as follows.

If a currency issuer A, which may include a central bank of a nation or a currency-managing body of a group, generates and transmits at least one currency-issuing transaction TrxA for issuing the currency by way of a user device at a step of S100, the server 100 may acquire the currency-issuing transaction TrxA by way of the communication part 110.

Herein, the currency-issuing transaction may include (i) information on a currency receiver, (ii) an issued amount of the currency, (iii) a public key of the currency issuer, and (iv) a signature value of the currency issuer generated by signing (i), (ii) and (iii) with a private key of the currency issuer. Also, the information on the currency receiver may be a public key of a specific user registered as a currency user, and a public key of the currency receiver and the public key of the currency issuer may have been recorded in the server 100 in advance or at an appropriate time as the need may be, and the information on the currency receiver may include at least one public key of the currency issuer or the specific user, which is recorded in the server 100. Its details will be explained in other processes. Also, the currency issuer A may have in advance the public key of the currency receiver B as information on the currency receiver B.

As one example, the currency-issuing transaction TrxA may have a data format of 1. a payment type, 2. a previous transaction ID, 3. the currency receiver, 4. the issued amount, 5. the public key of the currency issuer, and 6. the signature value of the currency issuer, but the scope of the present disclosure is not limited thereto.

Herein, "1. the payment type" may include an undelayed payment and a delayed payment as its type of the payment, and the undelayed payment may process a currency-related transaction without delay and the delayed payment may delay processing the currency-related transaction until a certain condition is satisfied. As one example, the delayed payment may allow a set-off between received amount and amount of a payment larger than a total balance, for resolving a liquidity problem when the amount for the payment is lacking. However, since the currency issuer is an institution or a body that issues additional amount of the currency, the delayed payment does not occur when issuing the currency, therefore the undelayed payment may be set as default, or the format of the data on the payment type may not be included in the currency-issuing transaction. And "2. the previous transaction ID" may include information on the total balance of the currency issuer or the currency user, and it may be a private transaction ID or a public transaction ID representing location information of a transaction previously generated, for buying or selling with regard to the currency respectively on the private blockchain network or the public blockchain network, thus may be absent when issuing the currency. Also, "3. the currency receiver" may be the public key PubB of the currency receiver of the issued amount of the currency, "4. the issued amount" may be amount of the currency to be issued, "5. the public key of the currency issuer" may be the public key PubA registered by the currency issuer, and "6. the signature value of the currency issuer" may be a signature value SignPrivA (1, 2, 3, 4, 5) generated by signing 1, 2, 3, 4, and 5 with the private key of the currency issuer.

Then, at a step of S110, the processor 120 of the server 100 may determine whether the currency issuer and the currency-issuing transaction TrxA including (i) the information on the currency receiver, (ii) the issued amount of the currency, (iii) the public key of the currency issuer, and (iv) the signature value of the currency issuer, are valid. Herein, the processor 120 of the server 100 may confirm or support another device to confirm a validity of the data format of the currency-issuing transaction TrxA, a validity of the currency receiver, a validity of the public key of the currency issuer, and a validity of the signature value of the currency issuer, to thereby determine whether the currency-issuing transaction TrxA is valid. As one example, the processor 120 may confirm each of the public keys of the currency receiver and the currency issuer acquired by applying the public key of the currency issuer to the signature value of the currency issuer A is identical to each of those in the currency-issuing transaction TrxA, to thereby determine whether the public keys of the currency receiver and the currency issuer are valid. Also, by verifying the signature value of the currency issuer using the public key of the currency issuer, the processor 120 may determine whether the signature value of the currency issuer and the currency issuer are valid.

Then, as a result of a confirmation at the step of S110, if the currency-issuing transaction is determined as valid at a step of S210, the server 100 may perform or support another device to perform processes of recording the currency-issuing transaction TrxA including (i) the information on the currency receiver, (ii) the issued amount of the currency, (iii) the public key of the currency issuer, and (iv) the signature value of the currency issuer in the private blockchain network at a step of S211, and providing a currency-issuing private transaction ID PrivTxid representing location information of the currency-issuing transaction TrxA on the private blockchain network to at least part of the currency issuer A and the currency receiver B at steps of S212 and S213. However, if the currency-issuing transaction is determined as invalid at a step of S220, the server 100 may notify or support another device to notify the currency issuer A of a fact that a registration failed in addition to an error message, at a step of S221. However, the registration in the public blockchain network 200 may be required as below, although the registration in the private blockchain network may not be required, in accordance with the present disclosure.

On the other hand, if the currency-issuing transaction TrxA is determined as valid, the server 100 may register or support another device to register a function value function (TrxA) generated by applying specific functions to the currency-issuing transaction TrxA including (i) the information on the currency receiver, (ii) the issued amount of the currency, (iii) the public key of the currency issuer, and (iv) the signature value of the currency issuer in the public blockchain network 200, at a step of S214. Herein, the specific functions used for calculating function values may include an MD4 function, an MD5 function, an SHA-0 function, an SHA-1 function, an SHA-224 function, an SHA-256 function, an SHA-384 function, an SHA-512 function and an HAS-160 function, but the scope of the present disclosure is not limited thereto. For example, a Triple SHA256 function may also be included.

Thereafter, the server 100 may acquire or support another device to acquire a currency-issuing public transaction ID PubTxid representing location information of the registered function value function(TrxA) on the public blockchain network 200, at a step of S215. Also, the server 100 may retrieve an OP message corresponding to the currency-issuing public transaction ID PubTxid from the public blockchain network 200.

As aforementioned, although the server 100 is described as registering the currency-issuing transaction by using the private blockchain network and the public blockchain network, the server 100 may use the public blockchain network only.

That is, if at least one of the currency-issuing transaction TrxA and the currency issuer A is determined as valid, the server 100 may perform or support another device to perform processes of registering in the public blockchain network 200 the currency-issuing transaction TrxA including (i) the information on the currency receiver, (ii) the issued amount of the currency, (iii) the public key of the currency issuer, and (iv) the signature value of the currency issuer, or the function value function(TrxA) of the currency-issuing transaction TrxA and acquiring the currency-issuing public transaction ID PubTxid representing location information of the currency-issuing transaction TrxA or its function value function(TrxA) on the public blockchain network 200. Then, the server 100 may provide or support another device to provide the currency-issuing public transaction ID PubTxid to at least part of the currency issuer A and the currency receiver B.

Next, by referring to FIG. 3, a process of registering the currency issuer A is described as follows.

If a request for registration of the currency issuer using the public key PubA thereof is acquired at a step of S300, the server 100 may perform or support another device to perform processes of determining whether the currency issuer A is valid, and if the currency issuer A is determined as valid at a step of S310, transmitting a random nonce RN for reference to the currency issuer A at a step of S311. If the currency issuer A is determined as invalid at a step of S320, for example, if the currency issuer is an illegal issuer, the server 100 may notify or support another device to notify the currency issuer A of a fact that a confirmation of the currency issuer failed, at a step of S321. However, a way of determining whether the currency issuer A is valid is not limited thereto, for example, a time stamp may be used to determine whether the currency issuer A is valid. For reference, the random nonce is used to determine whether the currency issuer is valid and its detail is described as below with an example.

On condition that the currency issuer A has created the private key PrivA and the public key PubA using a user device, if the public key PubA is transmitted to the server 100 for registering the currency issuer as an issuer of the currency, the server 100 may determine whether the currency issuer A of the acquired public key is valid. Herein, a Public Key Infrastructure based certificate, or identification information on the currency issuer A may be used to determine whether the currency issuer A is valid, but the scope of the present disclosure is not limited thereto. As one example, the currency issuer may be confirmed by a public key certificate based on the PKI, i.e., the Public Key Infrastructure, an OPSign certificate, or the identification information that can confirm an identity of a person, a bank, a group, or an organization, like an SSN, a passport, the Employer Identification Number, the Corporation Registration Number, the Business Registration Number, etc.

Thereafter, if a signature value SignPrivA(RN) of the random nonce generated by signing the random nonce RN for reference with the private key of the currency issuer A is acquired at a step of S312, the server 100 may determine whether the signature value SignPrivA(RN) of the random nonce is valid by using the public key of the currency issuer A. That is, the server 100 may extract the random nonce RN for comparison from the signature value SignPrivA(RN) of the random nonce by using the public key of the currency issuer, and may compare the extracted random nonce for comparison and the random nonce for reference transmitted to the currency issuer, to thereby determine the signature value SignPrivA(RN) as valid if the random nonce for comparison and the random nonce for reference are identical.

Further, if the signature value acquired from the currency issuer A is determined as valid at a step of S330, the server 100 may perform or support another device to perform processes of recording an issuer-registering transaction, i.e., transaction(RN, SignPrivA(RN), PubA) including the random nonce for comparison, the signature value of the random nonce for comparison, and the public key of the currency issuer, in the private blockchain network at a step of S331, and notifying the currency issuer A of a fact that a registration including an issuer-registering private transaction ID PrivTxid which represents location information of the issuer-registering transaction on the private blockchain network was successful, at a step of S332.

However, if the signature value acquired from the currency issuer A is determined as invalid, the server 100 may notify or support another device to notify the currency issuer A of a fact that a confirmation of the signature value failed, at a step of S341.

Also, if the signature value of the currency issuer A is determined as valid, the server 100 may perform or support another device to perform processes of recording a function value function(RN, SignPrivA(RN), PubA) of (i) the random nonce for comparison, (ii) the signature value of the random nonce for comparison, and (iii) the public key of the currency issuer in the public blockchain network at a step of S333, and acquiring an issuer-registering public transaction ID PubTxid representing location information of the recorded function value on the public blockchain network 200, at a step of S334.

Although the server 100 is described above as recording the issuer-registering transaction of the currency issuer A by using the private blockchain network and the public blockchain network, the server 100 may use the public blockchain network only.

That is, if the signature value of the currency issuer A is determined as valid, the server 100 may perform or support another device to perform processes of recording (I) the issuer-registering transaction transaction(RN, SignPrivA(RN), PubA) including (i) the random nonce for comparison, (ii) the signature value of the random nonce for comparison, and (iii) the public key of the currency issuer, or (II) a function value function(RN, SignPrivA(RN), PubA) of the issuer-registering transaction in the public blockchain network 200 at the step of S333, and acquiring the issuer-registering public transaction ID PubTxid representing location information of the issuer-registering transaction or its function value on the public blockchain network 200. Then, the server 100 may provide or support another device to provide the issuer-registering public transaction ID to the currency issuer A.

Figure 4B:
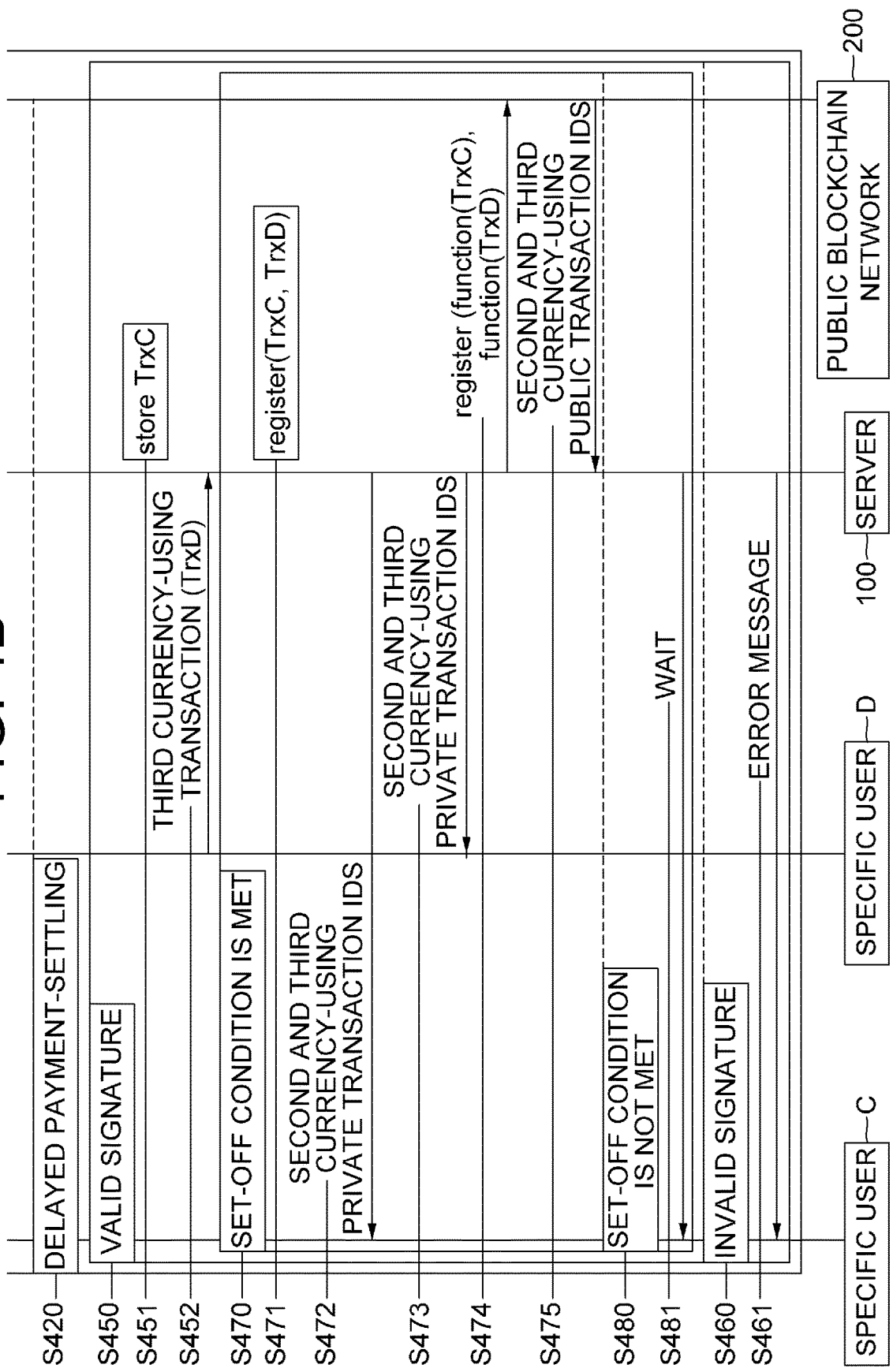
FIG. 4B is a drawing schematically illustrating a method for a delayed payment of the payment of the currency in accordance with one example embodiment of the present disclosure.

Next, by referring to FIGS. 4A and 4B, a method for settling the payment of the currency in accordance with one example embodiment of the present disclosure is described as follows. A part of the following description similar to the method of issuing the currency in accordance with one example embodiment of the present disclosure in FIG. 2 is omitted, as it is easily inferred from FIG. 2.

For settling the payment of the currency, if at least one second currency-using transaction TrxC for settling the payment of the currency by a specific user C is transmitted from the user device of the specific user C, the server 100 may acquire the second currency-using transaction TrxC by way of the communication part 110 at a step of S400.

Herein, the second currency-using transaction TrxC may include (i) at least one first currency-using transaction ID of at least one first currency-using transaction partly unused beforehand, (ii) the information on the currency receiver, (iii) a specific amount for settling the payment, (iv) a public key of the specific user C, and (v) a signature value of the specific user C generated by signing (i) the first currency-using transaction ID, (ii) the information on the currency receiver, (iii) the specific amount, and (iv) the public key of the specific user C with a private key of the specific user C. And said at least one first currency-using transaction ID of the first currency-using transaction partly unused beforehand may be a currency-related transaction with remaining amount regarding the payment received by the specific user C from the currency issuer or other users, and added quantity of unused amount of every first currency-using transaction owned by the specific user C may be the total balance of the specific user C. Also, the information on the currency receiver may be the public key of the currency receiver, who receives the currency being settled, among users registered as currency users, and the public key of the currency receiver and the public key of the specific user C may have been recorded in the server 100 in advance or at an appropriate time as the need may be, and the information on the currency receiver may include at least one public key of the currency issuer or the specific user, which is recorded in the server 100. Its details will be explained in other processes. Also, the specific user C may have the public key of the currency receiver in advance as information on the currency receiver.

As one example, the second currency-using transaction TrxC may have a data format of 1. a payment type, 2. the first currency-using transaction ID, 3. the currency receiver, 4. the used amount, 5. remaining amount, 6. information on an owner of the remaining amount, 7. the public key of the specific user, 8. the signature value of the specific user.

Herein, "1. the payment type" may include the undelayed payment and the delayed payment as its type of the payment, and the undelayed payment may process a currency-related transaction without delay and the delayed payment may delay processing of the currency-related transaction until a certain condition is satisfied. As one example, the delayed payment may allow a set-off between the received amount and the amount of the payment larger than the total balance, for resolving the liquidity problem when the amount for the payment is lacking. And "2. the first currency-using transaction ID" may include information on the total balance of the specific user C, and it may be a private transaction ID or a public transaction ID representing location information of the currency-using transaction previously received, and may be information on the currency-using transaction settled by the currency issuer or said other users and on the currency-using transaction including the partly unused amount beforehand, and the added quantity of remaining amount of every first currency-using transaction owned by the specific user C may be the total balance currently owned by the specific user C. Also, "3. the currency receiver" may be the public key PubB of the currency receiver of the settled amount of the currency, "4. the used amount" may be amount of the currency to be settled, "5. the remaining amount" may be amount remaining after settling the payment from the total balance of the specific user C and may be negative or zero after the settling, "6. the information on the owner of the remaining amount" may be information on the owner of "5. the remaining amount", and in one example embodiment of the present disclosure, may be the public key of the specific user C but may be absent if no balance remains, "7. the public key of the specific user" may be the public key of the specific user C who is about to settle the payment, and "8. the signature value of the specific user" may be a signature value SignPrivC(1, 2, 3, 4, 5, 6, 7) generated by signing 1, 2, 3, 4, 5, 6, and 7 with the private key of the specific user C.

Then, the server 100 may determine in which way the payment in the second currency-using transaction will be settled by referring to the total balance of the specific user C. Herein, if the total balance owned by the specific user C is equal to or greater than the amount for settling the payment, then the undelayed payment may be selected, and if the total balance owned by the specific user C is less than the amount for settling the payment, then the delayed payment may be selected. Also, the undelayed payment and the delayed payment may be determined according to the type of payment included in the second currency-using transaction, and even in case the second currency-using transaction indicates the undelayed payment, if the total balance owned by the specific user C is less than the amount of the payment, then the delayed payment may be selected.

Herein, if the second currency-using transaction TrxC is determined as indicating the undelayed payment at a step of S410, the server 100 may perform or support another device to perform processes of determining whether the signature value of the specific user C in the second currency-using transaction TrxC is valid, and if it is determined as valid at a step of S430, recording the second currency-using transaction TrxC in the private blockchain network at a step of S431, and providing a second currency-using private transaction ID PrivTxid representing location information of the second currency-using transaction TrxC on the private blockchain network to at least part of the specific user C and the currency receiver at a step of S432. However, if the signature value of the specific user C is determined as invalid at a step of S440, the server 100 may notify or support another device to notify the specific user C of a fact that a registration failed in addition to an error message, at a step of S441.

Also, if the signature value is determined as valid, the server 100 may register or support another device to register a function value function(TrxC) of the second currency-using transaction TrxC in the public blockchain network 200, at a step of S433. Thereafter, the server 100 may acquire or support another device to acquire a second currency-using public transaction ID PubTxid representing location information of the function value function(TrxC) registered on the public blockchain network 200, at a step of S434. Also, the server 100 may retrieve an OP message corresponding to the second currency-using public transaction ID PubTxid from the public blockchain network 200.

Although the server 100 is described above as registering the second currency-using transaction TrxC of the specific user C by using the private blockchain network and the public blockchain network, the server 100 may use the public blockchain network only.

That is, the server 100 may perform or support another device to perform processes of registering in the public blockchain network 200 the second currency-using transaction TrxC or its function value function(TrxC) which indicates the undelayed payment and includes the valid signature value of the specific user C and acquiring the second currency-using public transaction ID PubTxid representing location information of the second currency-using transaction TrxC or its function value function(TrxC) on the public blockchain network 200. Then, the server 100 may provide or support another device to provide the second currency-using public transaction ID PubTxid to at least part of the specific user C and the currency receiver.

On the other hand, if the second currency-using transaction TrxC is determined as indicating the delayed payment at a step of S420, the server 100 may determine whether the signature value of the specific user C in the second currency-using transaction TrxC is valid and if it is determined as valid at a step of S450, may record the second currency-using transaction TrxC in a storage like a set-off database, storage device, or memory at a step of S451. However, if the signature value of the specific user C is determined as invalid at a step of S460, the server 100 may notify or support another device to notify the specific user C of a fact that a registration failed in addition to an error message, at a step of S461.

Then, on condition that the second currency-using transaction TrxC has been recorded in the storage, if at least one third currency-using transaction TrxD is acquired, in which at least one of other users D is to settle the payment and the specific user C is its receiver, at a step of S452, the server 100 may confirm whether the third currency-using transaction TrxD and the second currency-using transaction TrxC satisfy at least one of set-off conditions. Herein, the third currency-using transaction TrxD may be a currency-using transaction stored as indicating the delayed payment and including the specific user C as its receiver, in which case the server 100 may perform a set-off of the second currency-using transaction TrxC in response to a set-off of the third currency-using transaction TrxD stored as indicating the delayed payment. Also, the server 100 may determine whether one of the set-off conditions is satisfied, which is a condition that the total balance of the specific user C is equal to or greater than 0 by the set-off performed in response to the third currency-using transaction TrxD.

Meanwhile, if none of the set-off conditions is satisfied by the acquired third currency-using transaction TrxD at a step of S480, the server may store the acquired third currency-using transaction TrxD and may wait for acquisition of another third currency-using transaction at a step of S481.

If one of the set-off conditions is satisfied by one or more third currency-using transactions TrxD at a step of S470, that is, if a total amount receivable by the multiple third currency-using transactions exceeds the amount to pay for by the second currency-using transaction TrxC, or if the total amount receivable by the multiple third currency-using transactions plus the total balance of the specific user C exceeds the amount to pay for by the second currency-using transaction TrxC, then the server 100 may perform a set-off between the second currency-using transaction TrxC and the multiple third currency-using transactions TrxD. Herein, the multiple third currency-using transactions TrxD may be (i) multiple currency transactions created by another specific user, (ii) multiple currency transactions created by other multiple users, or (iii) multiple currency transactions created by each of said other multiple users.

Also, if the specific user C and said other multiple users are connected in a circle as users/payers and receivers of the currency-using transactions of the delayed payment, the server 100 may perform a set-off between every currency-using transaction of the delayed payment connected in a circle. Apparently, in case certain one or more currency-using transactions of the delayed payment satisfy none of the set-off conditions due to difference in the amounts of the payments of other currency-using transactions, if said certain one or more currency-using transactions satisfy one of the set-off conditions due to another currency-using transaction, the server 100 may perform a set-off between every currency-using transaction of the delayed payment connected in a circle.

As one example, if a user A creates a currency-using transaction A of the delayed payment with a user B, the user B creates a currency-using transaction B of the delayed payment with a user C, the user C creates a currency-using transaction C of the delayed payment with a user D, the user D creates a currency-using transaction D of the delayed payment with the user A, thus a cyclic relation among the users A, B, C, and D with each of them as a payer and receiver to each other is created, then the server 100 may perform a set-off among the currency-using transactions A, B, C, and D created by the users A, B, C, and D. Clearly, each of the amounts of the payments of each of the currency-using transactions of the delayed payment must coincide, but if it does not, if each of the currency-using transactions of the delayed payment satisfies one of the set-off conditions, a set-off may be performed, where each of the currency-using transactions of the delayed payment satisfies one of the set-off conditions with a next currency-using transaction in turn thus forming a cyclic relation.

Then, the server 100 may perform or support another device to perform processes of recording the set-off second currency-using transaction TrxC and the set-off multiple third currency-using transactions TrxD in the private blockchain network at a step of S471, and providing the second currency-using private transaction ID PrivTxid and the third currency-using private transaction IDs PrivTxid respectively representing each piece of location information of the second currency-using transaction TrxC and the multiple third currency-using transactions TrxD on the private blockchain network to at least part of (i) the specific user C, (ii) the currency receiver, and (iii) one or more other users D at steps of S472 and S473. Herein, information stored, that is, the second currency-using transaction TrxC and the acquired multiple third currency-using transactions TrxD may be deleted.

Also, the server 100 may register or support another device to register the function value function(TrxC) of the set-off second currency-using transaction TrxC and each of the function values function(TrxD) of the set-off multiple third currency-using transactions TrxD in the public blockchain network 200, at a step of S474. That is, the server 100 may register or support another device to register information on every set-off currency-using transaction in the public blockchain network 200. Thereafter, the server 100 may acquire or support another device to acquire the second currency-using public transaction ID and the multiple third currency-using public transaction IDs respectively representing each piece of location information of function values function(TrxC) and function(TrxD) on the public blockchain network 200 at a step of S475. Also, the server 100 may retrieve each OP message corresponding to the second currency-using public transaction ID and to the multiple third currency-using public transaction IDs from the public blockchain network 200.

Although the server 100 is described above as registering the set-off second currency-using transaction TrxC of the specific user C and the set-off third currency-using transactions TrxD of said other users D by using the private blockchain network and the public blockchain network, the server 100 may use the public blockchain network only.

That is, the server 100 may perform or support another device to perform processes of registering the set-off second currency-using transaction TrxC or its function value function(TrxC) and the multiple third currency-using transactions TrxD or their function values function(TrxD) in the public blockchain network 200, and acquiring the second currency-using public transaction ID and the multiple third currency-using public transaction IDs respectively representing each piece of location information of the second currency-using transaction TrxC or its function value function(TrxC) and the multiple third currency-using transactions TrxD or their function values function(TrxD) on the public blockchain network 200. Then, the server 100 may provide or support another device to provide the second currency-using public transaction ID and the multiple third currency-using public transaction IDs to at least part of (i) the specific user C and (ii) at least one of said other users D.

Next, a process of the server 100 registering the specific user who uses the currency is described as follows. The process of registering the specific user is similar to the process of registering the currency issuer as in FIG. 3, and thus the explanation is omitted.

If a request for registration of the specific user C using the public key thereof is acquired, the server 100 may determine whether the specific user C is valid, and may transmit or support another device to transmit a random nonce to the specific user C if the specific user C is determined as valid. If the specific user C is determined as invalid, the server 100 may notify or support another device to notify the specific user C of a fact that a confirmation of the specific user failed.

On the other hand, in case the specific user C is determined as valid, if the signature value of the random nonce generated by signing the random nonce with the private key of the specific user is acquired, the server 100 may determine whether the signature value of the random nonce is legitimately signed, by applying the public key of the specific user to the signature value.

Further, if the signature value acquired from the specific user C is determined as valid, the server 100 may perform or support another device to perform processes of recording a user-registering transaction of the specific user including the random nonce, the signature value of the random nonce, and the public key of the specific user, in the private blockchain network, and providing a user-registering private transaction ID PrivTxid representing location information of the user-registering transaction on the private blockchain network to the specific user C.

However, if the signature value acquired from the specific user C is determined as invalid, the server 100 may notify or support another device to notify the specific user C of a fact that a confirmation of the signature value failed.

Further, if the signature value of the specific user C is determined as valid, the server 100 may perform or support another device to perform processes of recording the function value of the random nonce, the signature value of the random nonce, and the public key of the specific user in the public blockchain network, and acquiring a user-registering public transaction ID Txid representing location information of the function value on the public blockchain network.

Although the server 100 is described above as recording the user-registering transaction of the specific user by using the private blockchain network and the public blockchain network, the server 100 may use the public blockchain network only.

That is, if at least one of the signature value and the specific user is determined as valid, the server 100 may perform or support another device to perform processes of recording the user-registering transaction or its function value in the public blockchain network, and acquiring the user-registering public transaction ID Txid representing location information of the user-registering transaction or its function value on the public blockchain network. Then, the server 100 may transmit or support another device to transmit the acquired user-registering public transaction ID Txid to the specific user.

Meanwhile, the currency receiver B, the specific user C, and the specific user D may be the banking institutions or a person.

The present disclosure has an effect of improving reliability and security of the information on the issuance of the currency and on settling the payment by recording the information on the issuance of the currency and on settling the payment in the blockchain of the virtual currency to prevent forgery or illegal copying.

The present disclosure has another effect of improving reliability and security of the information on the issuance of the currency and on settling the payment by using the specific functions and cryptography to prevent forgery and illegal copying.

The present disclosure has still another effect of preventing duplicate payments of the currency by recording the information on the issuance of the currency and on settling the payment in the the blockchain of the virtual currency.

The present disclosure has still yet another effect of improving convenience of users by maintaining up-to-date settlement information without any settling procedure between the central bank and the banking institutions in a private sector.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for issuing a currency, comprising steps of:
    (a) acquiring from a currency issuer at a server at least one currency-issuing transaction including (i) information on a currency receiver, (ii) an issued amount of the currency, (iii) a public key of the currency issuer, and (iv) a signature value of the currency issuer generated by signing (i), (ii) and (iii) with a private key of the currency issuer;
        (a01) acquiring at the server a request for registration of the currency issuer using the public key of the currency issuer and performing processes of determining that the currency issuer is valid and transmitting a specific random nonce to the valid currency issuer;
        (a02) acquiring at the server a signature value of the specific random nonce generated by signing the specific random nonce with the private key of the currency issuer and performing processes of determining that the signature value of the specific random nonce is valid by using the public key of the currency issuer;
    (b) confirming validity at the server of the currency-issuing transaction and the currency issuer; and
    (c) performing using the server processes of:
        registering in a private blockchain network the validated currency-issuing transaction including (i) the information on the currency receiver, (ii) the issued amount of the currency, (iii) the public key of the currency issuer, and (iv) the signature value of the currency issuer, registration of the validated currency-issuing transaction including assigning a private transaction ID to the validated currency-issuing transaction;
        registering in the private blockchain network the issuer-registering transaction, including (1) the specific random nonce, (2) the signature value of the specific random nonce, and (3) the public key of the currency issuer;
        providing to the currency issuer and the currency receiver the currency-issuing private transaction ID representing at least one location of the validated currency-issuing transaction on the private blockchain network;
        providing to the currency issuer and the currency receiver at least one issuer-registering private transaction ID representing at least one location of the issuer-registering transaction on the private blockchain network;
        generating a function value of the validated currency-issuing transaction including (i) the information on the currency receiver, (ii) the issued amount of the currency, (iii) the public key of the currency issuer, and (iv) the signature value of the currency issuer;
        registering in a public blockchain network the function value of the validated currency-issuing transaction to prevent forgery and illegal copying of the validated currency-issuing transaction registered in the private blockchain network, registration of the function value of the validated currency-issuing transaction including assigning a public transaction ID to the function value of the validated currency-issuing transaction;
        registering in the public blockchain network the issuer-registering transaction, including (1) the specific random nonce, (2) the signature value of the specific random nonce, and (3) the public key of the currency issuer;

acquiring from the public blockchain network the currency-issuing public transaction ID representing at least one location of the function value of the validated currency-issuing transaction on the public blockchain network; and acquiring at least one issuer-registering public transaction ID representing at least one location of the issuer-registering transaction on the public blockchain network.

2. The method of claim 1, further comprising the step of:
confirming validity at the server of a data format of the currency-issuing transaction, validity of the currency receiver, validity of the public key of the currency issuer, and validity of the signature value of the currency issuer, wherein the signature value of the currency issuer is verified with the registered public key of the currency issuer, to thereby determine that the currency-issuing transaction is valid.

3. The method of claim 1, further comprising the step of:
determining at the server that the signature value of the currency issuer is valid by verifying the signature value of the currency issuer with the registered public key of the currency issuer.

4. The method of claim 1, wherein, at the step of (a01), the server determines that the currency issuer is valid by using one of (1) a certificate of the currency issuer based on a public key infrastructure and (2) information on an identification of the currency issuer.

5. A server for issuing a currency, comprising:
at least one memory that stores instructions; and
at least one processor configured to execute the instructions to:
(I) acquire from a currency issuer at the server at least one currency-issuing transaction including (i) information on a currency receiver, (ii) an issued amount of the currency, (iii) a public key of the currency issuer, and (iv) a signature value of the currency issuer generated by signing (i), (ii) and (iii) with a private key of the currency issuer;
(I01) acquire at the server a request for registration of the currency issuer using the public key of the currency issuer and performing processes of determining that the currency issuer is valid and transmitting a specific random nonce to the valid currency issuer;
(I02) acquire at the server a signature value of the specific random nonce generated by signing the specific random nonce with the private key of the currency issuer and performing processes of determining that the signature value of the specific random nonce is valid by using the public key of the currency issuer;
(II) confirm validity at the server of the currency-issuing transaction and the currency issuer; and
(III) perform using the server processes of:
registering in a private blockchain network the validated currency-issuing transaction including (i) the information on the currency receiver, (ii) the issued amount of the currency, (iii) the public key of the currency issuer, and (iv) the signature value of the currency issuer, registration of the validated currency-issuing transaction including assigning a private transaction ID to the validated currency-issuing transaction;

registering in the private blockchain network the issuer-registering transaction, including (1) the specific random nonce, (2) the signature value of the specific random nonce, and (3) the public key of the currency issuer;

providing to the currency issuer and the currency receiver the currency-issuing private transaction ID representing at least one location of the validated currency-issuing transaction on the private blockchain network;

providing to the currency issuer and the currency receiver at least one issuer-registering private transaction ID representing at least one location of the issuer-registering transaction on the private blockchain network;

generating a function value of the validated currency-issuing transaction including (i) the information on the currency receiver, (ii) the issued amount of the currency, (iii) the public key of the currency issuer, and (iv) the signature value of the currency issuer;

registering in a public blockchain network the function value of the validated currency-issuing transaction to prevent forgery and illegal copying of the validated currency-issuing transaction registered in the private blockchain network, registration of the function value of the validated currency-issuing transaction including assigning a public transaction ID to the function value of the validated currency-issuing transaction;

registering in the public blockchain network the issuer-registering transaction, including (1) the specific random nonce, (2) the signature value of the specific random nonce, and (3) the public key of the currency issuer;

acquiring from the public blockchain network the currency-issuing public transaction ID representing at least one location of the function value of the validated currency-issuing transaction on the public blockchain network; and acquiring at least one issuer-registering public transaction ID representing at least one location of the issuer-registering transaction on the public blockchain network.

6. The server of claim 5, wherein the processor is further configured to execute the instructions to:
confirm validity at the server of a data format of the currency-issuing transaction, validity of the currency receiver, validity of the public key of the currency issuer, and validity of the signature value of the currency issuer, wherein the signature value of the currency issuer is verified with the registered public key of the currency issuer, to thereby determine that the currency-issuing transaction is valid.

7. The server of claim 5, wherein the processor is further configured to execute the instructions to:
determine at the server that the signature value of the currency issuer is valid by verifying the signature value of the currency issuer with the registered public key of the currency issuer.

8. The server of claim 5, wherein, at the step of (I01), the server determines that the currency issuer is valid by using one of (1) a certificate of the currency issuer based on a public key infrastructure and (2) information on an identification of the currency issuer.

* * * * *